Patented June 18, 1935

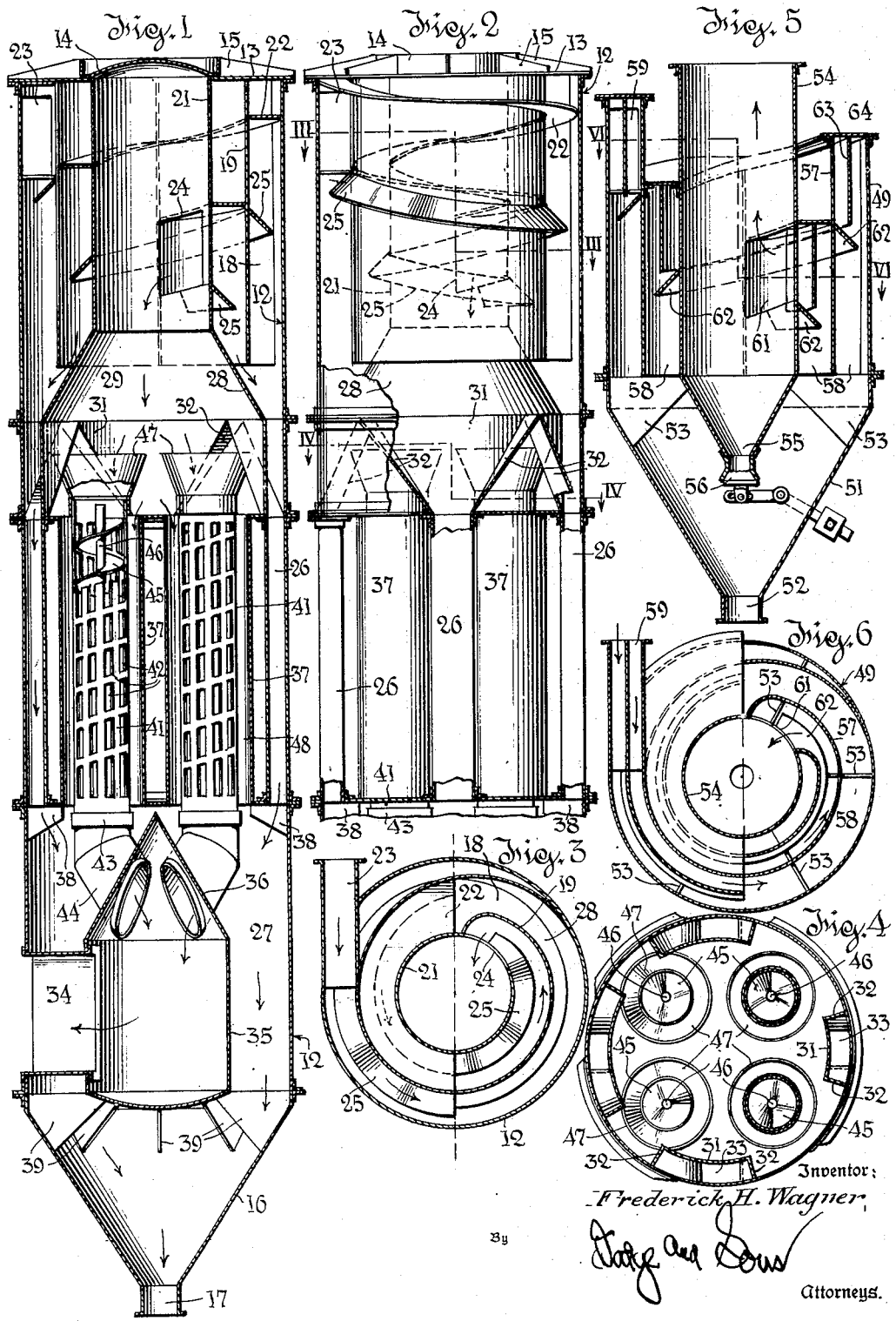

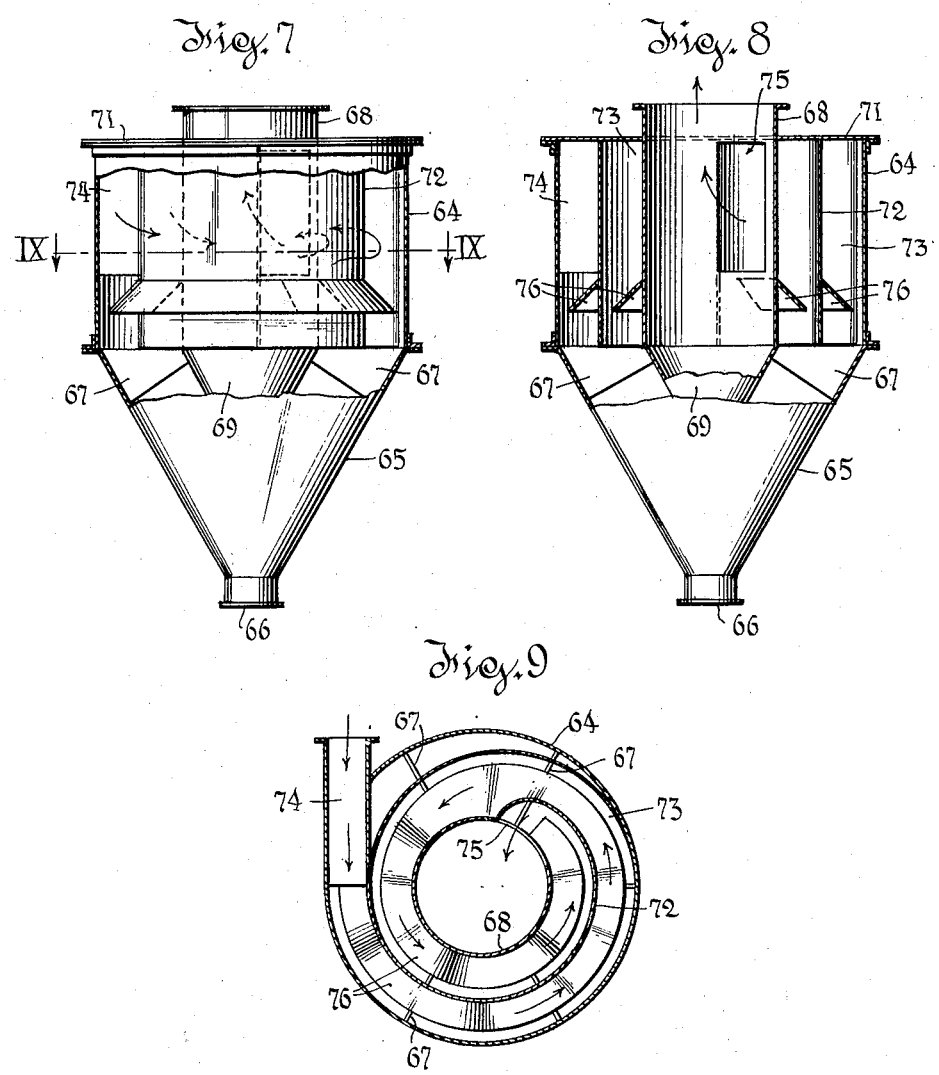

2,005,305

UNITED STATES PATENT OFFICE 2,005,305

DUST COLLECTOR

Frederick H. Wagner, Baltimore, Md., assignor to The Bartlett Hayward Company, a corporation of Maryland Application June 7, 1933, Serial No. 674,732

8 Claims. (Cl 183—84)

This invention relates to dust collectors, and particularly to collectors of the centrifugal type.

The main object of the invention is to provide an extractor in which the velocity of the gas from which dust is to be removed is maintained substantially constant throughout its passage through the apparatus.

Another object is to provide means whereby the coarse dust particles are initially separated from the gas stream and maintained in separated relation to the fine dust particles during the balance of the extraction process.

A further object is to provide baffling means for preventing dust from being drawn back into the stream of clean gas after the separation has been completed.

Other objects will appear from the following description when read in connection with the accompanying drawings, in which:

Figure 1 is a vertical sectional view of one form of collector embodying this invention;

Fig. 2 is a side elevation with parts broken away;

Fig. 3 is a section on line III—III of Fig. 2;

Fig. 4 is a section on line IV—IV of Fig. 2;

Fig. 5 is a vertical sectional view of a modified form of apparatus;

Fig. 6 is a section on line VI—VI of Fig. 5;

Fig. 7 is a view in side elevation of a still further modified form of apparatus, with parts broken away to show the interior construction;

Fig. 8 is a partial sectional view of the apparatus shown in Fig. 7; and

Fig. 9 is a section on line IX—IX of Fig. 7.

In dust collectors of the prior art, it has usually been the practice to provide gas passageways which are open at top and bottom, thereby causing a variation in the cross sectional area of the passage from point to point. As a consequence of this variation in cross section, the velocity of gas passing through the passage was frequently changed, thereby producing a tendency to draw dust once extracted back into the stream of clean gas. Such an arrangement was not only inefficient, but it was not capable of producing uniform and reliable separation.

Another difficulty met with in the prior art relating to centrifugal extractors, was that of having the coarse and easily separated dust particles pass through the major portion of the apparatus along with the fine particles, so as to cause unnecessary wear on the parts.

Accordingly, it is proposed in apparatus according to this invention to separate the coarse particles initially, and to deliver them to the dust collecting chamber through passages which are distinct from the passages through which the fine particles are delivered. Means are also provided for preventing the dust once separated from commingling with the streams of clean gas.

Referring first to Fig. 1, the reference character 12 designates an upright casing which is here shown as made up of a plurality of cylindrical sections secured together in any suitable manner. The top of the casing consists of an annulus 13 containing an opening which is closed by a suitable cover 14. Radial members 15, secured to the cover 14, project over the annulus 13 and serve to support and center it.

The bottom of the casing 12 terminates in a hopper 16 having a constricted dust discharge opening 17, through which the dust is delivered to any suitable collecting apparatus. The hopper 16 has steeply inclined side walls, so as to prevent the dust from adhering thereto and facilitating its passage to the outlet opening.

The portion of the apparatus in which the coarse particles are separated, consists of a spiral passageway 18 formed by a coiled partition member 19, which may be secured to the annulus 13 so as to depend therefrom, and cooperating with a central discharge tube 21.

The term "spiral" as used in this specification, is intended to include not only a flat spiral, in which the pitch is zero and the several turns are all in one plane, but also a cylindrical or conical spiral in which the separate turns are displaced to form a helix. In other words, the term "spiral" is intended to cover any structure in which a plurality of turns in the gas passage are employed to impart vortical motion to a gas, in order to subject the dust particles therein to centrifugal action.

The top of passage 18 is closed throughout its extent by a spiral member 22 (see Fig. 2), which is secured to the top of tangential inlet 23 and extends spirally around the collector at a continuously increasing distance from the top of the collector, until it reaches an opening 24 which connects the passageway 18 with the interior of the discharge tube 21. Consequently, as best shown in Fig. 3, the gas entering the tangential inlet 23, follows the outside of partition member 19 and is continuously deflected downward by the member 22 until it reaches the outlet opening 24.

Disposed within the passage 18 and extending throughout its extent, is an inclined spiral apron or deflector 25, which is of less width than the passageway 18 and serves to partially close the bottom of it. Consequently, as gas passes through the passage 18, the coarse particles of dust are thrown outwardly, and escape from this passage downwardly between the outer edge of the apron 25 and the outer wall of the passage 18. The angle of inclination of apron 25 is such that dust cannot accumulate on it and, hence, will slide downwardly and escape through tubes 26 to the dust-collecting chamber 27, and thence to the hopper 16.

The inclined apron 25 is spaced from the wall of the passageway to so restrict the space between its edge and the wall that the gas is compelled to follow the path of least resistance, this being the circular path above the apron.

Depending from the bottom of outlet tube 21 is an inclined frusto-conical apron 28, which serves to confine the gas entering the outlet tube from opening 24, to the chamber 29 from which it passes to the fine dust separating tubes. The apron 28 extends downwardly to form wedge-shaped sections 31 (see Fig. 2), which cooperate with the outer wall of the casing and with inclined pates 32 to form hoppers 33 terminating in tubes 26, connecting the discharge portion of the coarse dust separating chamber with the dust-collecting chamber 27.

As best shown in Fig. 4, there are a plurality of these delivery tubes 26 disposed around the casing and inclined plates 32 are so disposed as to prevent dust from accumulating on them. It will be evident, therefore, that the coarse dust particles when once separated from the gas stream, are entirely isolated from the remainder of the apparatus, so that there is no chance of their being returned to commingle with the clean gas.

The gas chamber 29 is connected to the outlet 34 of the apparatus through a plurality of centrifugal extractor tubes of the type disclosed and claimed in copending application Serial No. 548,208, filed July 1, 1931 and entitled Dust extractor No. 1,940,196, granted December 19, 1933. As here shown, these units are four in number and are symmetrically placed with relation to the bottom of chamber 29, and all communicate with the inside of a box-like casing 35 having a conical top 36 to prevent dust from collecting thereon.

Each of the fine dust extracting tubes is confined within a casing 37, which is sealed with respect to the floor of chamber 29 and isolates each of these units from all the others, thus preventing dust separated by one unit from being drawn back into another unit, should changes in gas velocity occur. These casings 37 are supported at the bottom by a plurality of spaced radial baffle or swirl plates 38, which are designed to prevent swirling of the dust within the chamber 27, and thus to prevent dust from being drawn back into any of the extractor units through which partially cleaned gas is passing. Casing 35 is supported by similar radial baffles 39, which although spaced a considerable distance from the extractor units, also prevent swirling of the dust within the hopper 16.

Inasmuch as each of the extractor units is like all the others, a description of one will be sufficient for all.

Each unit, therefore, consists of a cylindrical tube 41, containing a plurality of openings 42 through which the extracted dust is thrown. This tube is supported at the bottom within a collar 43 on a tube 44. Tube 44 connects with casing 35 through an opening in cone 36. Within the tube 41 is a worm-like member 45, having a central supporting core 46. As disclosed in the application above referred to, this spiral member or worm may conveniently be made of sections, so as to permit replacements of portions of the unit.

This worm is supported within the tube 41 in any suitable manner and serves with this tube to form a spiral passage through which gases directed from a hopper 47 may pass in a descending pathway. The descending gas is subjected to centrifugal action to throw the dust particles outwardly through the openings 42 into chamber 48 in tube 37, from whence it falls into the chamber 27. The gas passes downwardly through the tube 44 into the box 35 and thence to the outlet 34.

It will be clear that dust entering the tangential inlet 23 along with the gas stream, will pass downwardly along a spiral path until it reaches the opening 24 in discharge tube 21. During this travel, the coarser particles of dust will be thrown outwardly and will fall upon the apron 25 and gravitate into the tubes 26, and thence to the chamber 27 and hopper 16. The partially cleaned gas entering tube 21 will be divided into a plurality of separate streams within the chamber 29, a portion passing down through each of the centrifugal extractor units. Each unit will perform the separation to throw the fine dust particles outwardly into a chamber 48, and thence to chamber 27 and hopper 16. The gas free from both fine and coarse dust particles, will escape through the outlet 34 to the place where it is to be stored or used.

It will be very evident that the extraction performed by this apparatus is efficient and there is no possibility of the dust once extracted returning to the gas stream again. The coarse particles are not allowed to pass through the extractor units and to wear them away, and the coarse and fine particles are always maintained in separated relation as they pass downwardly to the collection chamber 27.

The presence of the swirl or baffle plates 38 and 39 effectively discourages formation of vortices within the dust chamber, and thus positively prevents slight variations in gas pressure from aspirating dust upwardly into the extractor units.

In the modification shown in Fig. 5, the top of the apparatus is modified to reduce the amount of metal required, and the extractor units for removing the fine dust particles are omitted. This apparatus is particularly suitable for removing "fly-ash" from furnace gases, or to treatment of any other gas containing particles of more or less uniform character in which the separation process is relatively simple.

The apparatus shown in Fig. 5 is generally similar to that just described, except that the spiral passageway is divided into separate passages by a partition member, thus dividing the gas stream into small individual streams which are more effectively subjected to centrifugal action, the particles having a shorter distance to be thrown.

Referring now to Fig. 5, the reference character 49 designates a casing carrying at the bottom a hopper 51, terminating in a discharge opening 52. Supported within the casing 49 by radial baffle plates 53 is a gas discharge tube 54, open at the top and restricted at the bottom where it terminates in an opening 55 which may be closed by a gravity-operated valve 56.

Mounted within the casing 49 and also supported by the baffles 53 is a coiled wall member 57, which cooperates with the tube 54 and the outer wall of the casing to form a spiral passageway 58, connecting a tangential inlet 59 with the outlet tube 54 through an opening 61. Mounted within the passageway 58, as before, is an inclined spiral apron 62 of less width than the passage 58, and serving to deflect separated dust downwardly into hopper 51, and at the same time, to compel the gas to follow the path of least resistance and to prevent separated dust from being drawn back into the stream of partially cleaned gas.

Inasmuch as certain types of dust, such as "fly-ash" have very little mass and consequently are not thrown through a very great distance by centrifugal action, it is advisable to cut down the cross sectional area of the spiral passageway. Consequently, I may make use of a partition 63 which depends from the top 64 of the passage 58 and terminates in spaced relation to the apron 62.

This partition divides the passage 58 into two spiral passageways, each of uniform cross sectional area throughout, and thus divides the gas stream entering the inlet 59 into two streams, each of which is treated independently of the other. As the gas passes around through the spiral passageways on both sides of partition 63, the dust particles are thrown outwardly those within the partition 63 striking apron 62 and sliding downwardly. The particles outside of partition 63 are thrown outwardly and may not strike the apron 62 but will join the particles from within the partition and all particles will fall into the hopper 51, and thence to the discharge opening 52. The cleaned gas will continue its travel through the passage 58 until it reaches opening 61 in tube 54. It will then pass upwardly in tube 54 and escape to its place of storage or use. The gravity-operated valve 56 is provided to permit any dust which may collect within the outlet tube 54 to be discharged. In normal operation of the apparatus, no dust will collect within this chamber, because it will be extracted before it reaches the opening 61.

The extracted dust will collect in hopper 51 from which it may be discharged continuously or intermittently through opening 52. The swirl or baffle plates 53 will function as described above to prevent dust in hopper 51 from being aspirated into the stream of cleaned, or partially cleaned gas, in passageway 58 above the apron 62.

In this form of the apparatus, the amount of metal required for construction is cut to a minimum since the top 64 of passage 58 itself forms the top of the casing and performs the function of the member 22, shown in Figs. 1 and 2. Consequently, the metal required to extend the casing up to the top of inlet 59 is saved.

In Figs. 7 to 9, there is shown a further modified form of the invention in which the spiral passage is confined to one plane, thus reducing the over-all length of the collector without detracting from its efficiency when used for the separation of "fly-ash" or other dust of uniform character which does not offer the difficult problems of separation incident to gases containing particles of varying size. The apparatus shown in Figs. 7 to 9 is, therefore, similar to that of Fig. 5, with the exception that, as shown, the partition member within the spiral passage is omitted and the pitch of the thread of the spiral is reduced to zero.

In Figs. 7 to 9, the reference character 64 designates the upright casing which terminates at the bottom in a dust-receiving hopper 65 having a discharge opening 66. Mounted within the hopper 65 and supported by radial baffles 67 is an outlet tube 68, terminating at the bottom in an inverted cone 69, the bottom end of which may be closed in the manner shown in Fig. 5.

The top of casing 64 is closed by a cover plate 71 through which the outlet tube 68 passes. Depending from this cover plate is a coiled partition 72 which cooperates with the outer wall of the casing to form a spiral passage 73, connecting tangential inlet 74 with the inside of tube 68 through outlet opening 75. Mounted within the passageway 73 is an inclined spiral apron 76 of less width than the passage 73, and otherwise constructed and arranged as specifically described in connection with the other forms of the invention.

Dusty gas entering the tangential inlet 74 passes around through the spiral passage 73 where the dust particles are subjected to centrifugal action. Some of these particles fall onto the apron 76 from which they are deflected down into the hopper 65 to be discharged. Other particles strike the outer wall of the casing or of the passage formed by member 72, and fall directly into the hopper. As here shown, after making substantially two turns, the gas reaches the opening 75, whence it is discharged into the outlet tube 68 and passes upwardly to its place of use or storage. As before, the radial plates 67 tend to prevent swirling of the dust within the hopper 65 and, hence, the chances of its returning to the gas stream are practically nil.

The location of the inclined apron 76 is such as to discourage return of the dust from the hopper to the gas stream after it has fallen through the opening between the outer edge of the apron and the outer wall of the passage. This apron also compels the gas to follow the path of least resistance.

It is to be understood that one or more partitions of the type shown in Fig. 5 may be added to the structure of Figs. 7 to 9, to separate the spiral passage 73 into a plurality of passages. The number of passages employed will depend upon the gas volume to be treated, as well as the degree of cleanliness desired in the gas.

This apparatus is particularly suitable for simple installations, where complete and effective separation is desired, without the use of complicated apparatus. It finds special utility in installations where separation of the most minute character is required. Its simplicity and effectiveness is due not only to the fact that the gas stream is directed through passages of uniform cross section, so as to prevent changes in gas velocity, but also the fact that dust once separated cannot be returned to the gas stream, and that the separate dust streams are prevented from commingling.

Although only a few forms of dust collectors embodying this invention have been shown and described, it will be obvious that changes and modifications may be made in the details within the scope of the appended claims, without departing from the spirit and scope of the invention.

What is claimed is:

1. A dust collector for separating dust particles from gas, comprising a hollow casing; an inlet and an outlet in said casing; a continuous spiral passageway closed at the top and of uniform cross sectional area connecting said inlet and outlet; an inclined spiral apron forming the bottom of said passageway, said apron being of less width than said passageway; a dust-collecting chamber beneath and in communication with said passageway; and means for isolating said outlet from said dust-collecting chamber below said apron.

2. A dust collector for separating dust particles from gas, comprising a hollow casing having a tangential inlet and a vertical outlet; a spiral passageway of uniform section and closed at the top for connecting said inlet with said outlet; an inclined spiral apron extending throughout said passageway and forming a bottom for said passageway, said apron being of less width than said passageway; a dust-collecting chamber beneath and in communication with said passageway; means for isolating said vertical outlet from said chamber; and means outside of said passageway for preventing aspiration of dust from said chamber into said passageway.

3. A dust collector, comprising a hollow casing having inlet and outlet tubes; a spiral passageway closed at the top and connecting said inlet and outlet tubes; a spiral apron in said passageway and forming a bottom therefor, the outer edge of said apron being spaced from the outer wall of said passageway throughout its extent; a dust-collecting chamber beneath said passageway and in communication with it through the opening between the outer edge of said apron and the outer wall of said passageway; and a plurality of substantially radial baffle plates disposed in said chamber beneath said passageway and forming a support for the outlet tube.

4. A dust collector, comprising a hollow casing; a tangential inlet and a vertical outlet for said casing; a spiral pasageway closed at the top and of uniform cross sectional area connecting said inlet and outlet within said casing; an inclined spiral apron secured to the inner wall of said passageway and spaced from the outer wall thereof to form a bottom; a spiral partition depending from the top of said passageway and terminating in spaced relation to said apron; a chamber beneath and in communication with said passageway to receive dust deflected from said apron; and means for isolating said chamber from said outlet.

5. A dust collector, comprising a hollow casing; a tangential inlet tube and a vertical outlet tube for said casing; a spiral pasageway closed at the top and of uniform cross sectional area connecting said inlet and outlet tubes within said casing; an inclined spiral apron secured to the inner wall of said passageway and spaced from the outer wall thereof to form a bottom; a spiral partition depending from the top of said passageway and terminating in spaced relation to said apron; a chamber beneath said passageway to collect dust discharged therefrom; and a plurality of substantially radial baffle plates disposed in said chamber beneath said passageway and forming a support for said outlet tube.

6. A dust collector, comprising an upright casing having an inlet for dusty gas and an outlet for clean gas; a spiral passageway connecting said inlet and said outlet, said passageway having a closed top and being of uniform cross sectional area throughout; an inclined spiral apron disposed in said passageway, said apron being of less width than said passageway; a dust-collecting chamber below said passageway; and swirl-preventing means outside of said passageway for preventing dust from being drawn back into the gas stream in said passageway, after its separation.

7. A dust collector, comprising a hollow casing containing an inlet for dusty gas and an outlet for clean gas; a spiral passageway connecting said inlet to said outlet; an inclined spiral deflector secured to one wall of the passageway, said deflector being of less width than said passageway; a partition means dividing said passageway into separate passageways, each of uniform area of cross section throughout, said partition means being disposed above and in spaced relation to said deflector; a dust-collecting chamber below said passageway; means for isolating said chamber from said passageway; and means outside of said passageway for preventing dust discharged from said passageway from returning thereto.

8. A dust collector, comprising a hollow casing having an inlet and outlet; a spiral, substantially closed passage of uniform cross section for subjecting gas entering said inlet to centrifugal action; a spiral apron of less width than said passage disposed therein for confining the gas to said passage; a plurality of centrifugal extractor tubes for subdividing the gas from said passage into a plurality of smaller streams; a dust-collecting chamber for receiving dust from said apron and from said tubes; means for connecting the extractor tubes with said outlet; and a common means for delivering gas from said passage to said extractor tubes and for enclosing said extractor tubes and isolating them from the discharge from said passage.

FREDERICK H. WAGNER.